United States Patent
Suzuki et al.

(10) Patent No.: US 10,755,117 B2
(45) Date of Patent: Aug. 25, 2020

(54) OBSTACLE DETERMINATION METHOD, PARKING SUPPORT METHOD, DISPATCH SUPPORT METHOD, AND OBSTACLE DETERMINATION DEVICE

(71) Applicant: Nissan Motor Co., Ltd., Yokohama-shi, Kanagawa (JP)

(72) Inventors: Yasuhiro Suzuki, Kanagawa (JP); Yasuhisa Hayakawa, Kanagawa (JP); Yohei Taniguchi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 16/329,708

(22) PCT Filed: Sep. 6, 2016

(86) PCT No.: PCT/JP2016/076119
§ 371 (c)(1),
(2) Date: Feb. 28, 2019

(87) PCT Pub. No.: WO2018/047223
PCT Pub. Date: Mar. 15, 2018

(65) Prior Publication Data
US 2019/0197322 A1  Jun. 27, 2019

(51) Int. Cl.
*G06K 9/00* (2006.01)
*B60W 30/09* (2012.01)
(Continued)

(52) U.S. Cl.
CPC .......... *G06K 9/00805* (2013.01); *B60R 21/00* (2013.01); *B60W 30/06* (2013.01);
(Continued)

(58) Field of Classification Search
CPC combination set(s) only.
See application file for complete search history.

(56) References Cited

U.S. PATENT DOCUMENTS

| 2012/0056734 A1* | 3/2012 | Ikeda | G08G 1/165 |
|---|---|---|---|
| | | | 340/425.5 |
| 2014/0236386 A1 | 8/2014 | Yoshizawa et al. | |

(Continued)

FOREIGN PATENT DOCUMENTS

| JP | 2005326963 A | 11/2005 |
|---|---|---|
| JP | 2008174192 A | 7/2008 |

(Continued)

*Primary Examiner* — Thomas G Black
*Assistant Examiner* — Ana D Thomas
(74) *Attorney, Agent, or Firm* — Young Basile Hanlon & MacFarlane, P.C.

(57) ABSTRACT

A method of determining obstacles determines if a detected object detected outside a subject vehicle is an obstacle for the subject vehicle on the basis of a predetermined determination criterion. In this method, a determination is made whether or not the detected object detected outside the subject vehicle is a driver or passenger of the subject vehicle. When the detected object is not the driver or passenger, a determination is made whether or not the detected object is an obstacle for the subject vehicle on the basis of a first determination criterion. When the detected object is the driver or passenger, a determination is made whether or not the detected object is an obstacle for the subject vehicle on the basis of a second determination criterion with which the detected object is less likely to be determined as an obstacle for the subject vehicle than with the first determination criterion.

7 Claims, 8 Drawing Sheets

(51) Int. Cl.
*B60R 21/00* (2006.01)
*G06K 9/32* (2006.01)
*B60W 30/06* (2006.01)
*B60W 40/02* (2006.01)
*G06T 7/73* (2017.01)

(52) U.S. Cl.
CPC ............ *B60W 30/09* (2013.01); *B60W 40/02* (2013.01); *G06K 9/3241* (2013.01); *G06T 7/73* (2017.01)

(56) References Cited

U.S. PATENT DOCUMENTS

| | | | |
|---|---|---|---|
| 2016/0144857 A1 | 5/2016 | Ohshima | |
| 2016/0272244 A1* | 9/2016 | Imai | G08G 1/166 |
| 2017/0308092 A1* | 10/2017 | Altinger | G05D 1/0246 |
| 2018/0170367 A1 | 6/2018 | Ohshima | |

FOREIGN PATENT DOCUMENTS

| | | | |
|---|---|---|---|
| JP | 2010282332 A | 12/2010 |
| JP | 2012216079 A | 11/2012 |
| JP | 2013043475 A | 3/2013 |
| JP | 2014032489 A | 2/2014 |
| JP | 2015081022 A | 4/2015 |
| JP | 2016006603 A | 1/2016 |
| JP | 2016099953 A | 5/2016 |
| WO | 2013042260 A1 | 3/2013 |

* cited by examiner

FIG. 5
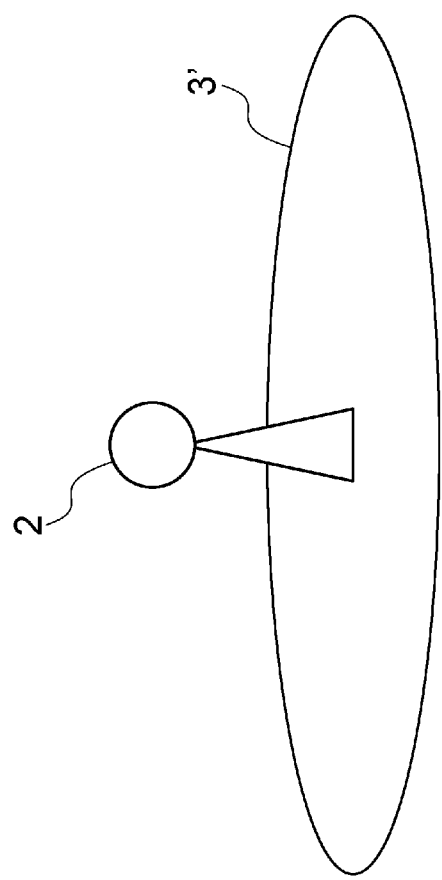
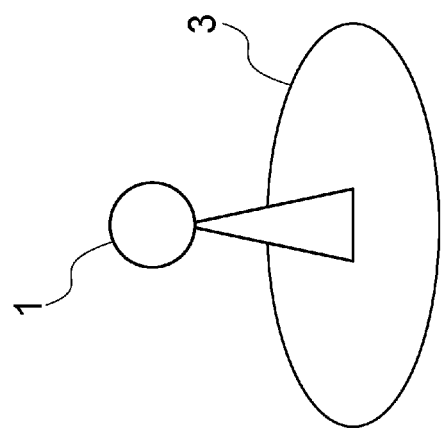

OBSTACLE DETERMINATION METHOD, PARKING SUPPORT METHOD, DISPATCH SUPPORT METHOD, AND OBSTACLE DETERMINATION DEVICE

TECHNICAL FIELD

The present invention relates to an obstacle determination method, a parking assist method, an exit assist method, and an obstacle determination device that determine obstacles for a vehicle.

BACKGROUND

A vehicle remote control device is known which operates as follows. When a vehicle is controlled to move from a parking space to a target position, an obstacle located on a trajectory for the vehicle is detected with reference to an image defined by image information output from an imaging device and the vehicle is controlled to make a stop upon detection of such an obstacle (see Japanese Patent Application JP2012-216079A, for example).

The driver or passenger of the vehicle to be remote-controlled may recognize the trajectory for the vehicle. In the vehicle remote control device as described in Japanese Patent Application JP2012-216079A, unfortunately, a person located on the trajectory for the vehicle is detected as an obstacle regardless of whether or not the person is the driver or passenger of the vehicle, and deceleration of the vehicle may be unnecessarily performed during movement of the vehicle.

SUMMARY

A problem to be solved by the present invention is to provide an obstacle determination method and an obstacle determination device that are able to appropriately carry out the determination of an obstacle for the vehicle.

The present invention solves the above problem as follows. When a detected object detected outside a subject vehicle is the driver or passenger of the subject vehicle, a determination is made whether or not the detected object is an obstacle for the subject vehicle on the basis of a second determination criterion with which the detected object is less likely to be determined as an obstacle for the subject vehicle than with a first determination criterion that is employed when the detected object is not the driver or passenger of the subject vehicle.

According to the present invention, the determination of an obstacle for the vehicle can be appropriately carried out and it is therefore possible to prevent deceleration of the vehicle from being unnecessarily performed during movement of the vehicle.

BRIEF DESCRIPTION OF THE DRAWINGS

FIG. 5 is a set of diagrams for describing a method of setting determination criteria for an obstacle for the subject vehicle according to another embodiment;

DETAILED DESCRIPTION

Figure 1:
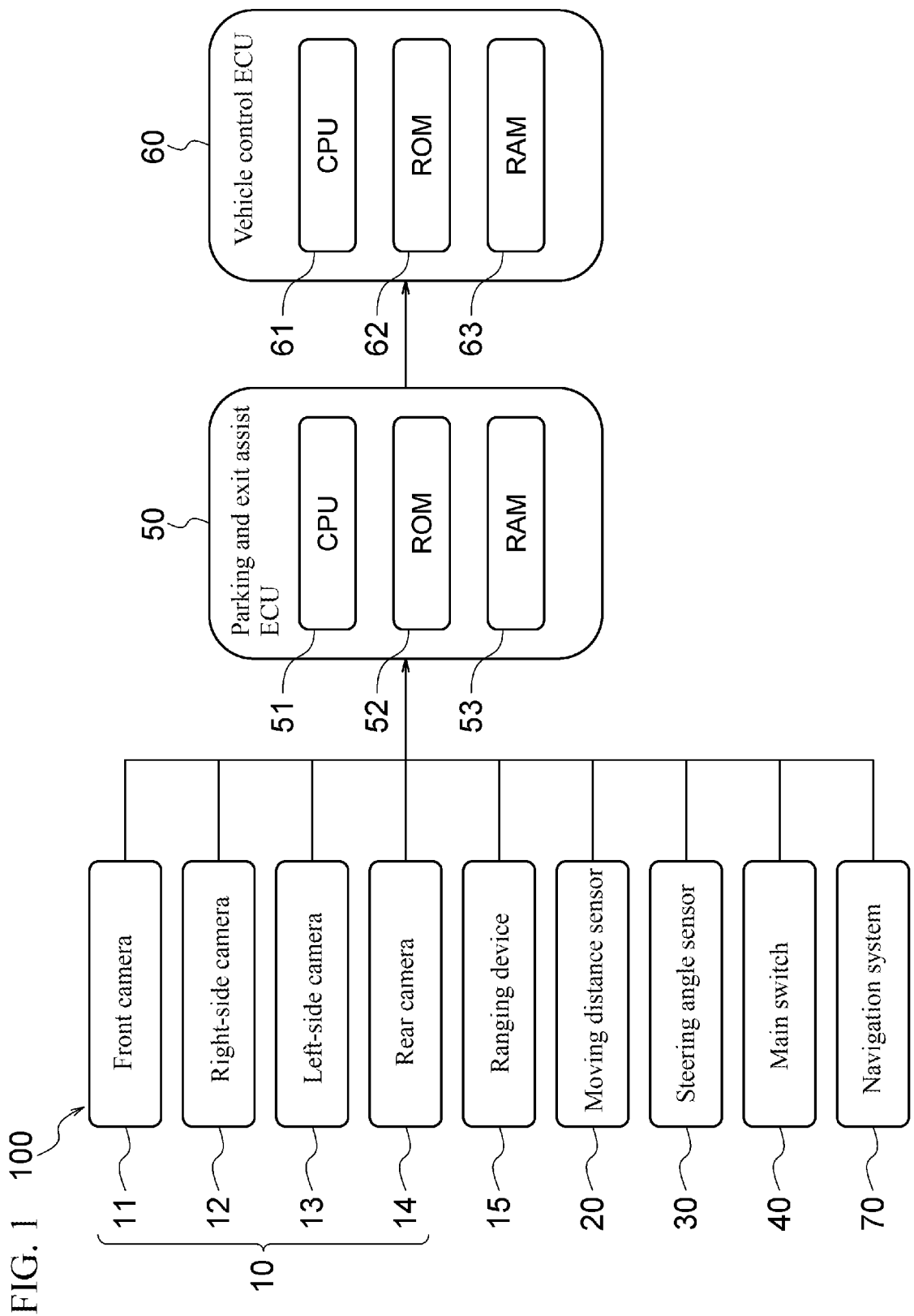
FIG. 1 is a block diagram illustrating the configuration of a parking and exit assist apparatus according to one or more embodiments of the present invention.

Hereinafter, one or more embodiments of the present invention will be described with reference to the drawings. FIG. 1 is a block diagram illustrating the configuration of a parking and exit assist apparatus 100 according to one or more embodiments of the present invention. The parking and exit assist apparatus 100 is equipped in a vehicle and assists a parking operation of moving (parking) the vehicle into a parking space and an exit operation of moving the vehicle from the parking space.

Here, the parking and exit assist apparatus 100 according to one or more embodiments of the present invention can achieve the parking operation and exit operation of the vehicle by remote control. For example, the driver or passenger of the vehicle inputs a command to start the parking or exit assist to a remote control device, such as a remote controller or a mobile terminal, outside the vehicle thereby to achieve the parking operation and exit operation of the vehicle.

The parking and exit assist apparatus 100 according to one or more embodiments of the present invention comprises a set of cameras 10, a ranging device 15, a moving distance sensor 20, a steering angle sensor 30, a main switch 40, a parking and exit assist electronic control unit (ECU) 50, a vehicle control ECU 60, and a navigation system 70. The parking and exit assist apparatus 100 further comprises hardware modules (not illustrated), such as an engine control ECU and a power assist ECU for steering, which are ordinarily equipped in a vehicle. These components are connected to one another via a controller area network (CAN) or other in-vehicle LAN to mutually exchange information.

The set of cameras 10 comprises a front camera 11, a right-side camera 12, a left-side camera 13, and a rear camera 14, for example, as illustrated in the figure. The front camera 11, which is installed at the front bumper of the vehicle or in the vicinity thereof, captures images ahead of the subject vehicle and outputs the image information to the parking and exit assist ECU 50. The right-side camera 12, which is installed on the right side of the vehicle (e.g. at the right-side part of the front of the vehicle), captures images on the right side of the subject vehicle and outputs the image information to the parking and exit assist ECU 50. The left-side camera 13, which is installed on the left side of the vehicle (e.g. at the left-side part of the front of the vehicle), captures images on the left side of the subject vehicle and outputs the image information to the parking and exit assist ECU 50. The rear camera 14, which is installed at the rear bumper of the vehicle or in the vicinity thereof, captures images behind the subject vehicle and outputs the image information to the parking and exit assist ECU 50.

The ranging device 15 is a radar device or a sonar, such as a millimeter-wave radar, laser radar, or ultrasonic radar.

The ranging device 15 is installed at the same position as any of the cameras 11 to 14 and detects the presence or absence of objects such as obstacles, pedestrians, and other vehicles around the vehicle, the positions of the objects, and the distances to the objects.

The moving distance sensor 20 calculates the moving amount of the subject vehicle and outputs it to the parking and exit assist ECU 50. The moving distance sensor 20 can be configured, for example, using a rotation speed sensor or the like that detects the rotation speed of a wheel of the subject vehicle.

The steering angle sensor 30, which is installed inside the steering column, for example, detects the rotation angle of the steering wheel and outputs it to the parking and exit assist ECU 50.

The main switch 40 is a switch that is operated by the user to instruct the start of parking assist and exit assist. When the main switch 40 is not operated, it outputs an OFF signal to the parking and exit assist ECU 50, and when the main switch 40 is operated, it outputs an ON signal to the parking and exit assist ECU 50. The main switch 40 is installed, for example, at a location on a remote control device, such as a remote controller or a mobile terminal, which is carried by the driver or passenger who performs remote control outside the vehicle, a location at which the driver can operate the main switch 40 in the vehicle, such as a location around the instrument panel of the subject vehicle or around the steering wheel, or other appropriate location. The main switch 40 may be a software switch provided on the screen of a mobile terminal such as a smartphone capable of communicating with the subject vehicle via a network, a software switch provided on the screen of a navigation device, or other appropriate switch.

The parking and exit assist ECU 50 is a controller that comprehensively controls the parking and exit assist apparatus 100. The parking and exit assist ECU 50 comprises a ROM 52 that stores a parking and exit assist program, a CPU 51 as an operation circuit that executes the program stored in the ROM 52 to serve as the parking and exit assist apparatus 100 according to one or more embodiments of the present invention, and a RAM 53 that serves as an accessible storage device. The parking and exit assist ECU 50, to which detection information or commands are input from the set of cameras 10, the ranging device 15, the moving distance sensor 20, the steering angle sensor 30, and the main switch 40, calculates a target steering angle and a target vehicle speed of the subject vehicle and outputs them to the vehicle control ECU 60.

The vehicle control ECU 60 is a controller that performs the drive control of the vehicle. The vehicle control ECU 60 comprises a ROM 62 that stores a vehicle drive control program, a CPU 61 as an operation circuit that executes the program stored in the ROM 62 to serve as a vehicle control device, and a RAM 63 that serves as an accessible storage device. The vehicle control ECU 60, to which the target steering angle and target vehicle speed of the subject vehicle are input from the parking and exit assist ECU 50, performs the drive control of the subject vehicle in cooperation with other ECUs, such as the engine control ECU and the power assist ECU for steering.

Figure 2:
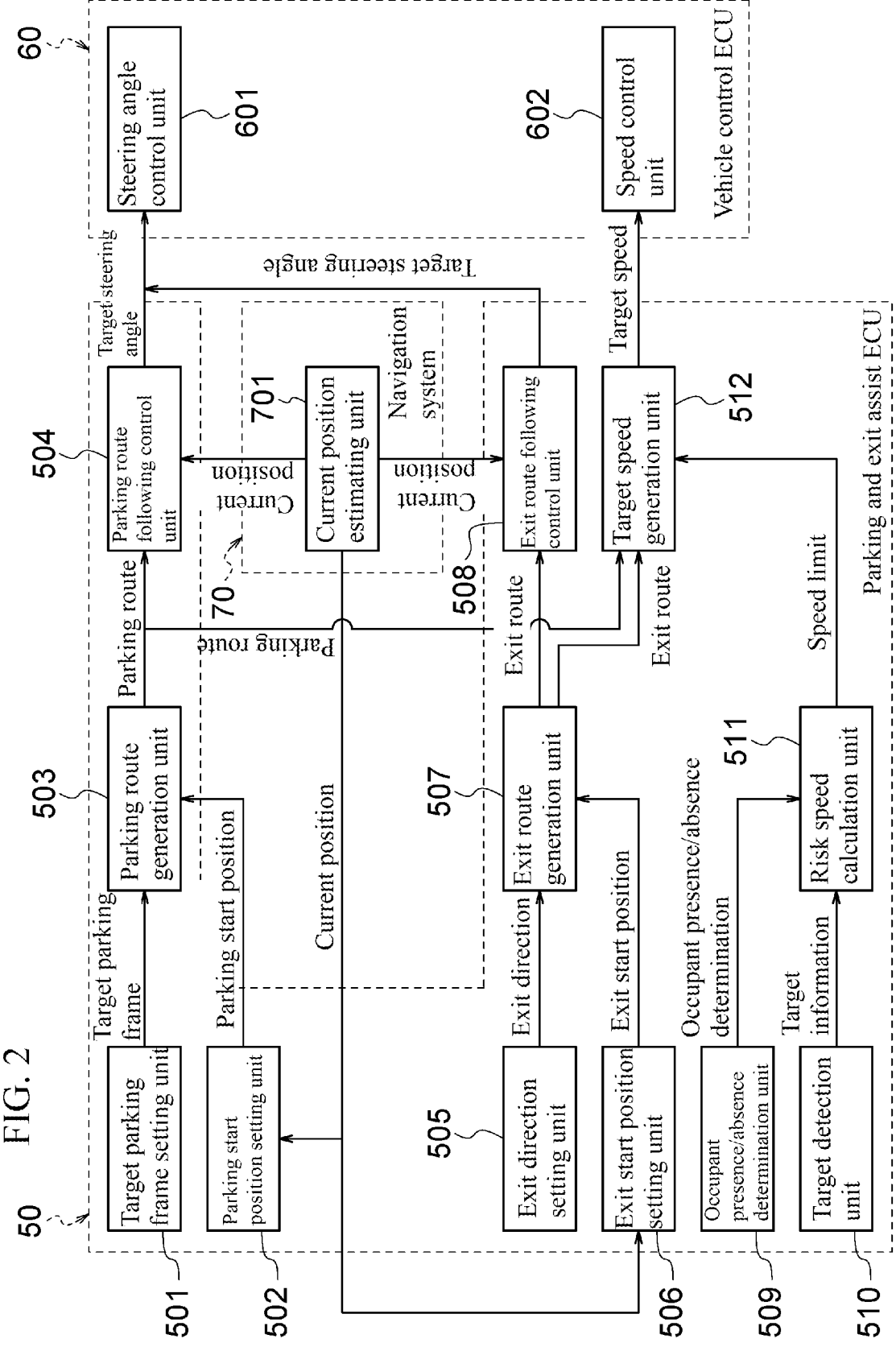
FIG. 2 is a block diagram for describing functions of a parking and exit assist ECU of FIG. 1.

FIG. 2 is a block diagram for describing functions of the parking and exit assist ECU 50. As illustrated in the figure, the parking and exit assist ECU 50 comprises a target parking frame setting unit 501, a parking start position setting unit 502, a parking route generation unit 503, a parking route following control unit 504, an exit direction setting unit 505, an exit start position setting unit 506, an exit route generation unit 507, an exit route following control unit 508, an occupant presence/absence determination unit 509 (the term "occupant" as used herein refers to the driver or passenger of the subject vehicle), a target detection unit 510, a risk speed calculation unit 511, and a target speed generation unit 512. The vehicle control ECU 60 includes a steering angle control unit 601 and a speed control unit 602. The navigation system 70 includes a current position estimation unit 701. The current position estimation unit 701 estimates the current position of the subject vehicle and outputs the estimation result to the parking start position setting unit 502, the parking route following control unit 504, the exit start position setting unit 506, and the exit route following control unit 508. Examples of the process of estimating the current position include a process of measuring the current position of the subject vehicle utilizing a global positioning system (GPS), a process of acquiring the current position via road-to-vehicle communication, and a process of calculating the current position on the basis of the steering amount of the steering and the operation amount of the accelerator.

The target parking frame setting unit 501 sets a parking frame into which the subject vehicle is parked by automated driving (this parking frame will be referred to as a "target parking frame," hereinafter). The target parking frame setting unit 501 first detects parking frames existing in the parking lot from the images captured by the cameras 11 to 14 and then selects spaces into which parking is possible (such spaces will be referred to as "available parking spaces," hereinafter) from among the detected parking frames.

In a process of detecting parking frames, first, an overhead view image is generated from images captured by the cameras 11 to 14, and frame line candidates that may constitute parking frames are detected from the overhead view image. Then, a determination is made whether or not the detected frame line candidates satisfy determination conditions regarding the distances from other frame lines, the relative angles with respect to other frame lines, and the lengths, and spaces defined by the frame line candidates satisfying the determination conditions are detected as the parking frames. It is not essential to generate the overhead view image from the images captured by the cameras 11 to 14 and to detect the parking frames from the overhead view image. For example, information on the parking frames may be acquired via communication with the outside of the vehicle, such as so-called road-to-vehicle communication or vehicle-to-vehicle communication.

In a process of detecting available parking spaces, a determination is made whether or not obstacles such as parked vehicles are present in the detected parking frames or on the routes when parking into the parking frames, on the basis of the ranging information (reflection point information) from the ranging device 15, and parking frames without obstacles are detected as the available parking spaces. It is not essential to detect the available parking spaces on the basis of the ranging information from the ranging device 15, and the available parking spaces may also be detected from the images captured by the cameras 11 to 14 or a camera installed in the parking lot. In addition or alternatively, information on the available parking spaces may be acquired from the parking lot management center.

The target parking frame setting unit 501 then detects one or more parking spaces recommended for the driver or passenger of the subject vehicle (such parking spaces will be referred to as "recommended parking spaces," hereinafter) from among the available parking spaces and presents the recommended parking spaces to the driver or passenger of the subject vehicle. Examples of the process of detecting the recommended parking spaces include a process of detecting available parking spaces having the shortest required time when parking into the available parking spaces as the recommended parking spaces and a process of detecting available parking spaces closest to the gaze point of the driver of the subject vehicle as the recommended parking spaces. In a process of presenting the recommended parking spaces, the display is controlled to display an overhead view image of a plurality of parking frames including the recommended parking spaces.

The target parking frame setting unit 501 then receives designation of a target parking frame made by the driver or passenger of the subject vehicle and outputs the designated target parking frame to the parking route generation unit 503. In an exemplary method, the designation of the target parking frame may be performed in such a manner that the driver or passenger touches a recommended parking space displayed on a touch panel-type display or the driver or passenger uses an operation key to move a cursor displayed on the display to the recommended parking space displayed on the display and operates a determination button.

The parking start position setting unit 502 outputs a position at which the parking assist process is started (this position will be referred to as a "parking start position," hereinafter) to the parking route generation unit 503. For example, when the main switch 40 is operated, the parking start position setting unit 502 acquires the current position of the subject vehicle at that moment from the current position estimation unit 701 and sets the acquired current position as the parking start position.

The parking route generation unit 503 generates a route from the parking start position set by the parking start position setting unit 502 to the target parking frame set by the target parking frame setting unit 501 (this route will be referred to as a "parking route," hereinafter) and outputs the generated parking route to the parking route following control unit 504 and the target speed generation unit 512. In a process of generating the parking route, for example, the route of a curve from the parking start position to a turning position (position at which turn for parking is performed) and the route of a curve from the turning position to the target parking frame are calculated. It is not essential to calculate the parking route, and the parking route determined for each parking frame may be preliminarily stored in a memory (ROM) and read out from the memory. In addition or alternatively, information on a preliminarily determined parking route may be acquired via road-to-vehicle communication or vehicle-to-vehicle communication.

The parking route following control unit 504 crosschecks the current position of the subject vehicle output from the current position estimation unit 701 with the parking route output from the parking route generation unit 503 and detects deviations (yaw angle deviation and lateral deviation) of the traveling position of the subject vehicle with reference to the parking route. The parking route following control unit 504 calculates a target steering angle so that the detected deviations decrease or become respective thresholds or less and outputs the calculated target steering angle to the steering angle control unit 601. The steering control unit 601 controls the steering angle of the subject vehicle so as to achieve the target steering angle output from the parking route following control unit 504.

The target speed generation unit 512 calculates a target speed in accordance with the parking route output from the parking route generation unit 503 and outputs the calculated target speed to the speed control unit 602. The target speed is, for example, such a speed that acceleration or deceleration is performed in accordance with the curvature of the parking route. The target speed generation unit 512 also calculates a target speed in accordance with an exit route output from the exit route generation unit 507, which will be described later, and outputs the calculated target speed to the speed control unit 602. Here, when a speed limit is output from the risk speed calculation unit 511 which will be described later, the target speed generation unit 512 calculates a target speed that is not higher than the speed limit. The speed control unit 602 controls the speed of the subject vehicle so as to achieve the target speed output from the target speed generation unit 512.

The exit direction setting unit 505 sets an exit direction from the parking frame in which the subject vehicle is parked, and outputs the exit direction to the exit route generation unit 507. For example, the exit direction setting unit 505 receives designation of an exit direction made by the driver or passenger of the subject vehicle and sets the received direction as the exit direction, or preliminarily stores an exit direction determined for each parking frame in a memory (ROM) and reads out the exit direction from the memory, or acquires a preliminarily determined exit direction via road-to-vehicle communication or vehicle-to-vehicle communication.

The exit route generation unit 507 generates a route from the parking position of the subject vehicle in the exit direction set by the exit direction setting unit 505 (this route will be referred to as an "exit route," hereinafter) and outputs the generated exit route to the exit route following control unit 508 and the target speed generation unit 512. In a process of generating the exit route, when a turn for exit is necessary, for example, the route of a curve from the parking position to a turning position (position at which the turn for exit is performed) and the route of a curve from the turning position to the target exit line are calculated. It is not essential to calculate the exit route, and the exit route determined for each parking frame may be preliminarily stored in a memory (ROM) and read out from the memory. In addition or alternatively, a preliminarily determined exit route may be acquired via road-to-vehicle communication or vehicle-to-vehicle communication.

The exit route following control unit 508 crosschecks the current position of the subject vehicle output from the current position estimation unit 701 with the exit route output from the exit route generation unit 507 and detects deviations (yaw angle deviation and lateral deviation) of the traveling position of the subject vehicle with reference to the exit route. The exit route following control unit 508 calculates a target steering angle so that the detected deviations decrease or become respective thresholds or less and outputs the calculated target steering angle to the steering angle control unit 601. The steering control unit 601 controls the steering angle of the subject vehicle so as to achieve the target steering angle output from the exit route following control unit 508.

The occupant presence/absence determination unit 509 determines whether or not the driver or passenger of the vehicle is present outside the vehicle and the position of the driver or passenger of the vehicle present outside the vehicle, and outputs the determination results to the risk speed calculation unit 511. The occupant presence/absence determination unit 509 detects the position of a remote control device such as a remote controller or a mobile terminal for remote control of the parking operation and exit operation, for example, by a position detection system utilizing a known radio scheme such as a radiowave arrival time difference scheme or a radiowave reception intensity scheme and determines whether the detected position of the remote control device is inside or outside the vehicle and where the detected position of the remote control device is located outside the vehicle.

The target detection unit 510 detects a target existing outside the vehicle on the basis of the ranging signal output from the ranging device 15 and outputs detection information including the position of the target to the risk speed calculation unit 511. In a process of detecting a target, the target is recognized on the basis of reflection point positional information clouds (referred to as "point clouds," hereinafter) that are input as clouds of polar coordinates from the ranging device 15. In this process of detecting a target, the point clouds input from the ranging device 15 first undergo coordinate conversion from the polar coordinates to the xyz coordinates for integration, and clustering is then performed to extract a set of clouds close to each other. In addition or alternatively, detection of a target may be performed by analyzing the image information output from the cameras 11 to 14. Then, the target is detected from the point clouds.

The risk speed calculation unit 511 sets a risk potential that is indicative of the level of a risk that the subject vehicle comes close to or collides with an obstacle for the subject vehicle present outside the subject vehicle. When the risk potential on the travel route of the subject vehicle exceeds a threshold, the risk speed calculation unit 511 calculates a speed limit and outputs it to the target speed generation unit 512. In response to the detection information of a target output from the target detection unit 510, the risk speed calculation unit 511 sets the risk potential on the basis of the determination result output from the occupant presence/absence determination unit 509. The set risk potential is then compared with a predetermined value that is preliminarily set, and a determination is made whether the risk potential exceeds the threshold or is not higher than the threshold.

Figure 3:
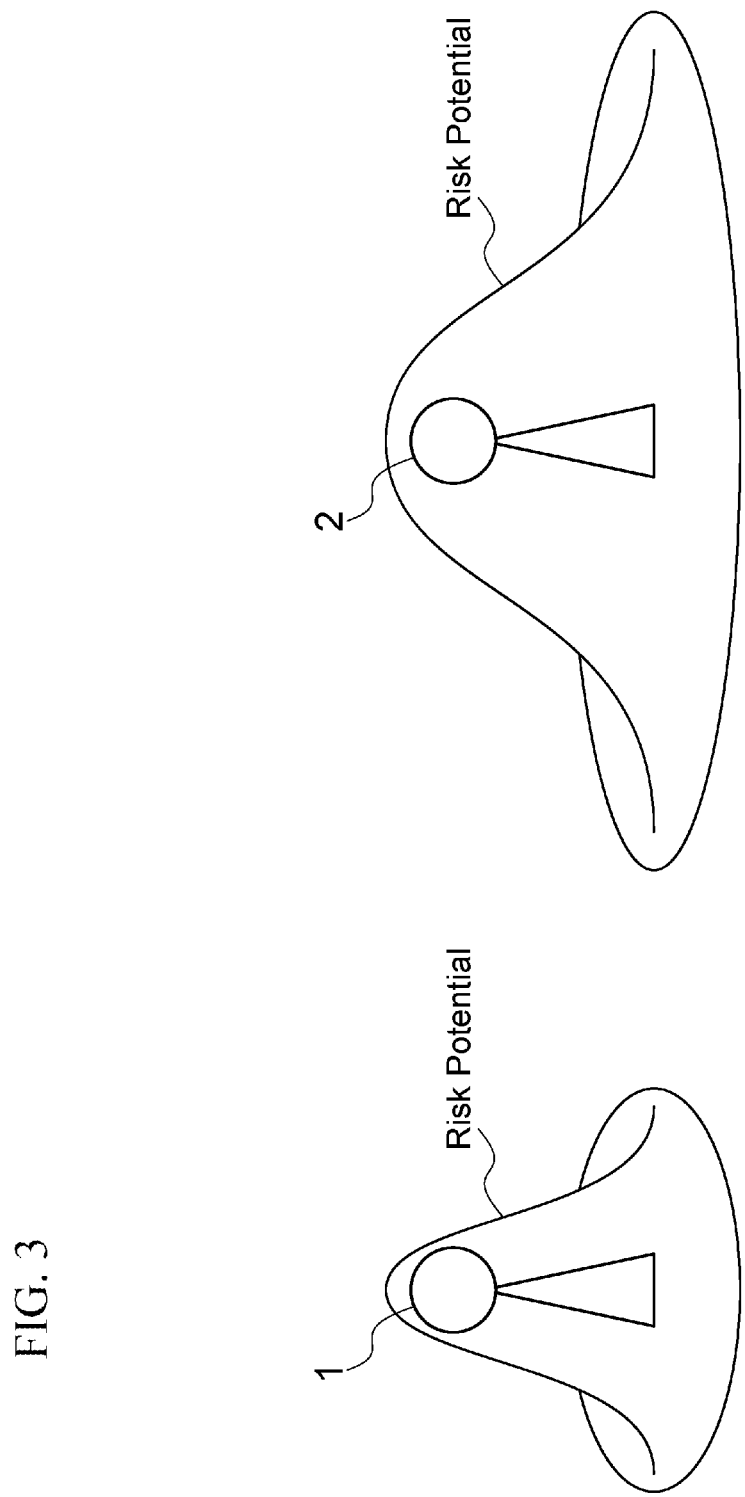
FIG. 3 is a set of diagrams for describing a method of setting a risk potential.

FIG. 3 is a set of diagrams for describing a method of setting the risk potential. The left-side diagram of the figure illustrates the distribution of the risk potential when the target detected by the target detection unit 510 is an occupant 1 (i.e. the driver or a passenger) of the subject vehicle while the right-side diagram of the figure illustrates the distribution of the risk potential when the target detected by the target detection unit 510 is a person who is neither the driver nor a passenger of the subject vehicle (this person will be referred to as a "non-occupant 2," hereinafter).

As illustrated in FIG. 3, the risk potential when the target detected by the target detection unit 510 is an occupant 1 of the subject vehicle (this risk potential will be referred to as a "second risk potential," hereinafter) has a distribution with smaller variance than that of the risk potential when the target detected by the target detection unit 510 is a non-occupant 2 (this risk potential will be referred to as a "first risk potential," hereinafter). That is, when the target detected by the target detection unit 510 is an occupant 1 of the subject vehicle, the risk speed calculation unit 511 sets a determination criterion (second determination criterion) with which the target is less likely to be determined as an obstacle used for limiting the speed of the subject vehicle than with a determination criterion (first determination criterion) when the target detected by the target detection unit 510 is a non-occupant 2. Thus, the determination criteria are employed with which a risk potential with smaller variance is less likely to be determined, but the present invention is not limited to this, and the level of a risk may be set lower.

Figure 4:
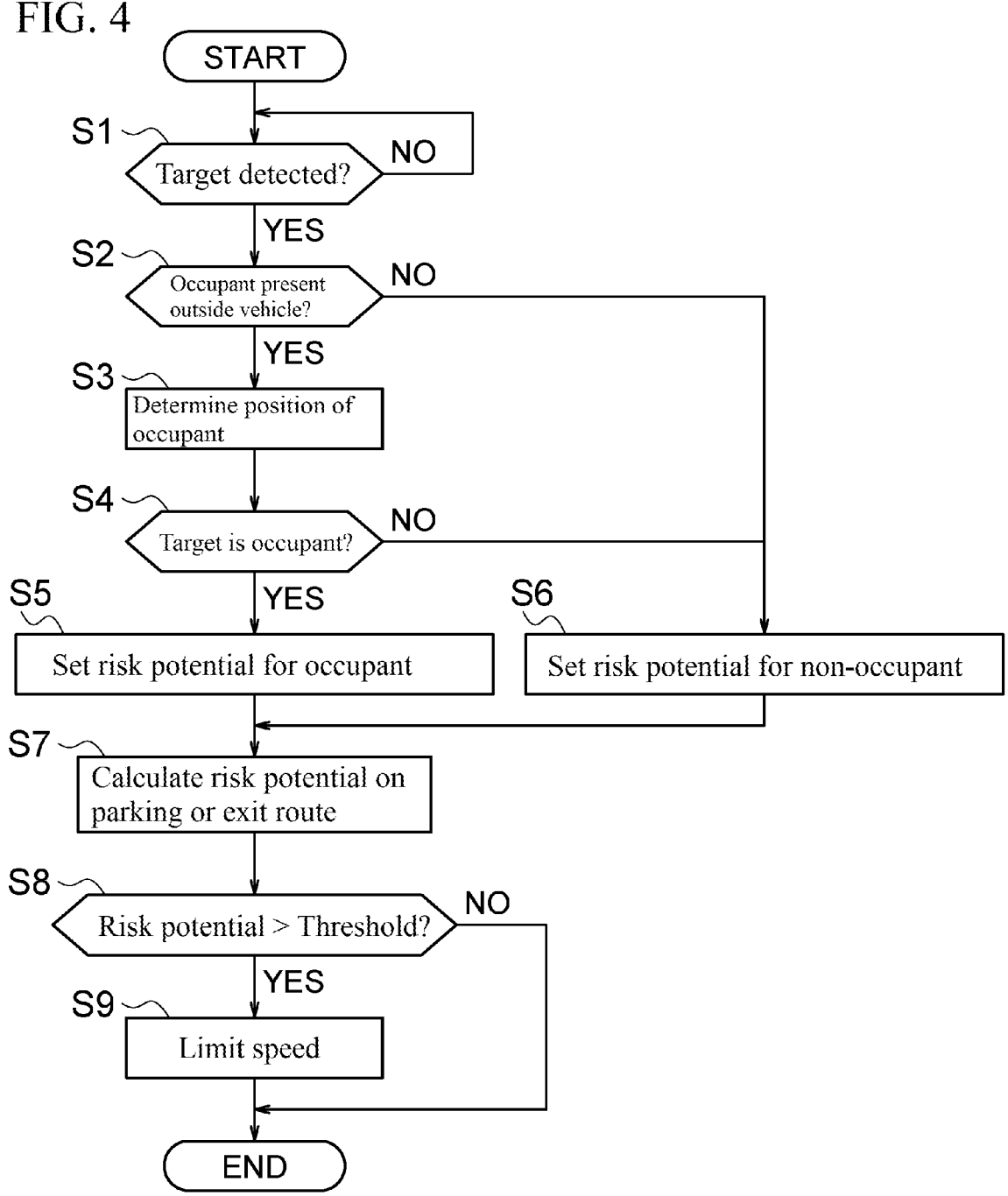
FIG. 4 is a flowchart illustrating the procedure of parking or exit assist for the subject vehicle executed by the parking and exit assist apparatus.

FIG. 4 is a flowchart illustrating the procedure of parking or exit assist executed by the parking and exit assist apparatus 100. The control represented by the flowchart is started when the main switch 40 is operated and the start of parking or exit assist is instructed, and the routine proceeds to step S1.

In step S1, the target detection unit 510 determines whether or not a target outside the vehicle is detected. An affirmative determination in this step is followed by step S2 in which the occupant presence/absence determination unit 509 determines whether or not an occupant 1 of the subject vehicle is present outside the vehicle. An affirmative determination in step S2 is followed by step S3 while a negative determination is followed by step S6. In step S3, the occupant presence/absence determination unit 509 determines the position of the occupant 1 present outside the vehicle.

Then, in step S4, the risk speed calculation unit 511 crosschecks the position of the target detected by the target detection unit 510 with the position of the occupant of the subject vehicle determined by the occupant presence/absence determination unit 509 and determines whether or not the target detected by the target detection unit 510 is the occupant of the subject vehicle. An affirmative determination in this step is followed by step S5 while a negative determination is followed by step S6.

In step S5, the risk speed calculation unit 511 sets the second risk potential which is a risk potential when the target detected by the target detection unit 510 is an occupant 1. On the other hand, in step S6, the risk speed calculation unit 511 sets the first risk potential which is a risk potential when the target detected by the target detection unit 510 is a non-occupant 2.

Steps S5 and S6 are followed by step S7 in which the risk speed calculation unit 511 calculates the risk potential on the parking or exit route of the subject vehicle. Then, in step S8, the risk speed calculation unit 511 determines whether or not the risk potential on the parking or exit route of the subject vehicle exceeds a threshold. An affirmative determination is followed by step S9 while a negative determination concludes the process.

In step S9, the risk speed calculation unit 511 calculates a speed limit and outputs it to the target speed generation unit 512, which generates a target speed that is not higher than the speed limit and outputs the target speed to the speed control unit 602. The speed control unit 602 controls the speed of the subject vehicle so as to achieve the target speed generated by the target speed generation unit 512. Here, when the speed limit calculated by the risk speed calculation unit 511 is lower than the target speed before the risk potential on the parking or exit route of the subject vehicle exceeds the threshold, the speed control unit 602 controls the subject vehicle to decelerate.

As described above, in the method of determining obstacles for the subject vehicle according to one or more embodiments of the present invention, the parking and exit assist ECU 50 is used to determine whether or not the detected object detected outside the subject vehicle is an obstacle for the subject vehicle on the basis of the first and second risk potentials. Here, the first risk potential is referred to by a determination criterion that is set when the detected object detected outside the subject vehicle is a non-occupant 2 of the subject vehicle while the second risk potential is referred to by a determination criterion that is set when the detected object detected outside the subject vehicle is an occupant 1 of the subject vehicle. With the latter determination criterion (second risk potential), the detected object detected outside the subject vehicle is less likely to be determined as an obstacle for the subject vehicle than with the former determination criterion (first risk potential). This can reduce the possibility that the occupant 1 of the subject vehicle who recognizes the trajectory for parking or exit of the subject vehicle is determined as an obstacle for the subject vehicle, thereby to prevent unnecessary execution of control of the subject vehicle to avoid the obstacle for the subject vehicle. Specifically, it is possible to prevent deceleration or stop of the vehicle from being unnecessarily performed during movement of the vehicle.

FIG. 5 is a set of diagrams for describing a method of setting determination criteria for an obstacle for the subject vehicle according to another embodiment. In the method of setting determination criteria for an obstacle for the subject vehicle according to the present embodiment, the risk speed calculation unit 511 (see FIG. 2) sets a range for determining whether or not the target detected outside the vehicle is an obstacle used for limiting the speed of the subject vehicle (this range will be referred to as an "obstacle determination range 3, 3'," hereinafter) rather than setting the above-described risk potentials.

When the parking or exit route of the subject vehicle is partially included in the set obstacle determination range 3, 3', the risk speed calculation unit 511 calculates a speed limit and outputs it to the target speed generation unit 512. In response to the recognition information of a target output from the target detection unit 510, the risk speed calculation unit 511 sets the obstacle determination range 3, 3' on the basis of the determination result output from the occupant presence/absence determination unit 509.

The left-side diagram of FIG. 5 illustrates the obstacle determination range 3 when the target detected by the target detection unit 510 is an occupant 1 of the subject vehicle while the right-side diagram of FIG. 5 illustrates the obstacle determination range 3' when the target detected by the target detection unit 510 is a non-occupant 2. As illustrated in FIG. 5, the obstacle determination range 3 when the target detected by the target detection unit 510 is an occupant 1 is narrower than the obstacle determination range 3' when the target detected by the target detection unit 510 is a non-occupant 2. That is, when the target detected by the target detection unit 510 is an occupant 1, the risk speed calculation unit 511 sets a determination criterion for an obstacle with which the detected target is less likely to be determined as an obstacle used for limiting the speed of the subject vehicle as compared with when the target detected by the target detection unit 510 is a non-occupant 2.

As described above, in the method of setting determination criteria for an obstacle for the subject vehicle according to the present embodiment, the first obstacle determination range 3' or the second obstacle determination range 3 is set as a determination criterion for determining whether or not the detected object detected outside the subject vehicle is an obstacle for the subject vehicle. Here, the first obstacle determination range 3' is referred to by a determination criterion that is set when the detected object detected outside the subject vehicle is a non-occupant 2 of the subject vehicle while the second obstacle determination range 3 is referred to by a determination criterion that is set when the detected object detected outside the subject vehicle is an occupant 1 of the subject vehicle. With the latter determination criterion (second obstacle determination range 3), the detected object detected outside the subject vehicle is less likely to be determined as an obstacle for the subject vehicle than with the former determination criterion (first obstacle determination range 3'). This can reduce the possibility that the occupant 1 of the subject vehicle who recognizes the trajectory for parking or exit of the subject vehicle is determined as an obstacle for the subject vehicle, thereby to prevent unnecessary execution of control of the subject vehicle to avoid the obstacle for the subject vehicle. Specifically, it is possible to prevent deceleration or stop of the vehicle from being unnecessarily performed during movement of the vehicle.

Figure 6:
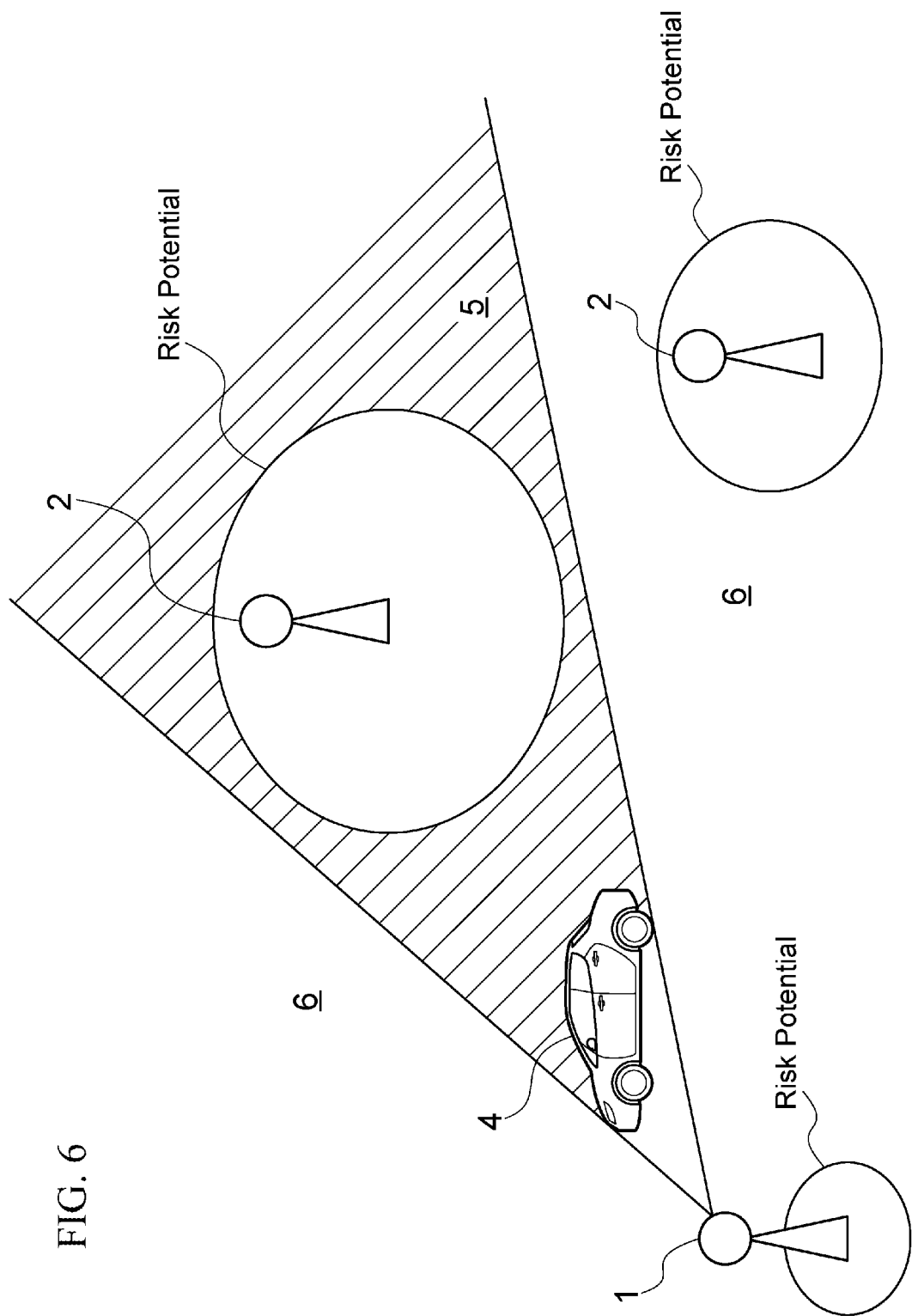
FIG. 6 is a diagram for describing a method of setting determination criteria for an obstacle for the subject vehicle according to another embodiment.

FIG. 6 is a diagram for describing a method of setting determination criteria for an obstacle for the subject vehicle according to another embodiment. In the method of setting determination criteria for an obstacle for the subject vehicle according to the present embodiment, when the target detected by the target detection unit 510 is an occupant 1, the risk speed calculation unit 511 (see FIG. 2) sets the risk potential having a distribution with smaller variance than that of the risk potential when the target detected by the target detection unit 510 is a non-occupant 2. In addition to this, the risk speed calculation unit 511 sets the risk potential in an area that is a blind side due to the subject vehicle 4 from the occupant 1 of the subject vehicle 4 present outside the subject vehicle 4 (this area will be referred to as a "blind side area 5," hereinafter) to be higher than the risk potential in an area that is not a blind side due to the subject vehicle 4 from the occupant 1 of the subject vehicle 4 present outside the subject vehicle 4 (this area will be referred to as a "non-blind side area 6," hereinafter).

That is, when the detected object detected outside the vehicle by the target detection unit 510 is an occupant 1 of the subject vehicle 4, a determination criterion for an obstacle is set with which the detected object is less likely to be determined as an obstacle used for limiting the speed of the subject vehicle 4 as compared with when the detected object detected outside the vehicle by the target detection unit 510 is a non-occupant 2, and in addition to this, when the detected object detected outside the vehicle by the target detection unit 510 is present in the blind side area 5, a determination criterion for an obstacle is set with which the target is more likely to be determined as an obstacle used for limiting the speed of the subject vehicle 4 as compared with when the target detected by the target detection unit 510 is present in the non-blind side area 6. Through this operation, when a non-occupant 2 is present in the blind side area 5, the non-occupant 2 is more likely to be determined as an obstacle used for limiting the speed of the subject vehicle 4 as compared with when the non-occupant 2 is present in the non-blind side area 6.

Figure 7:
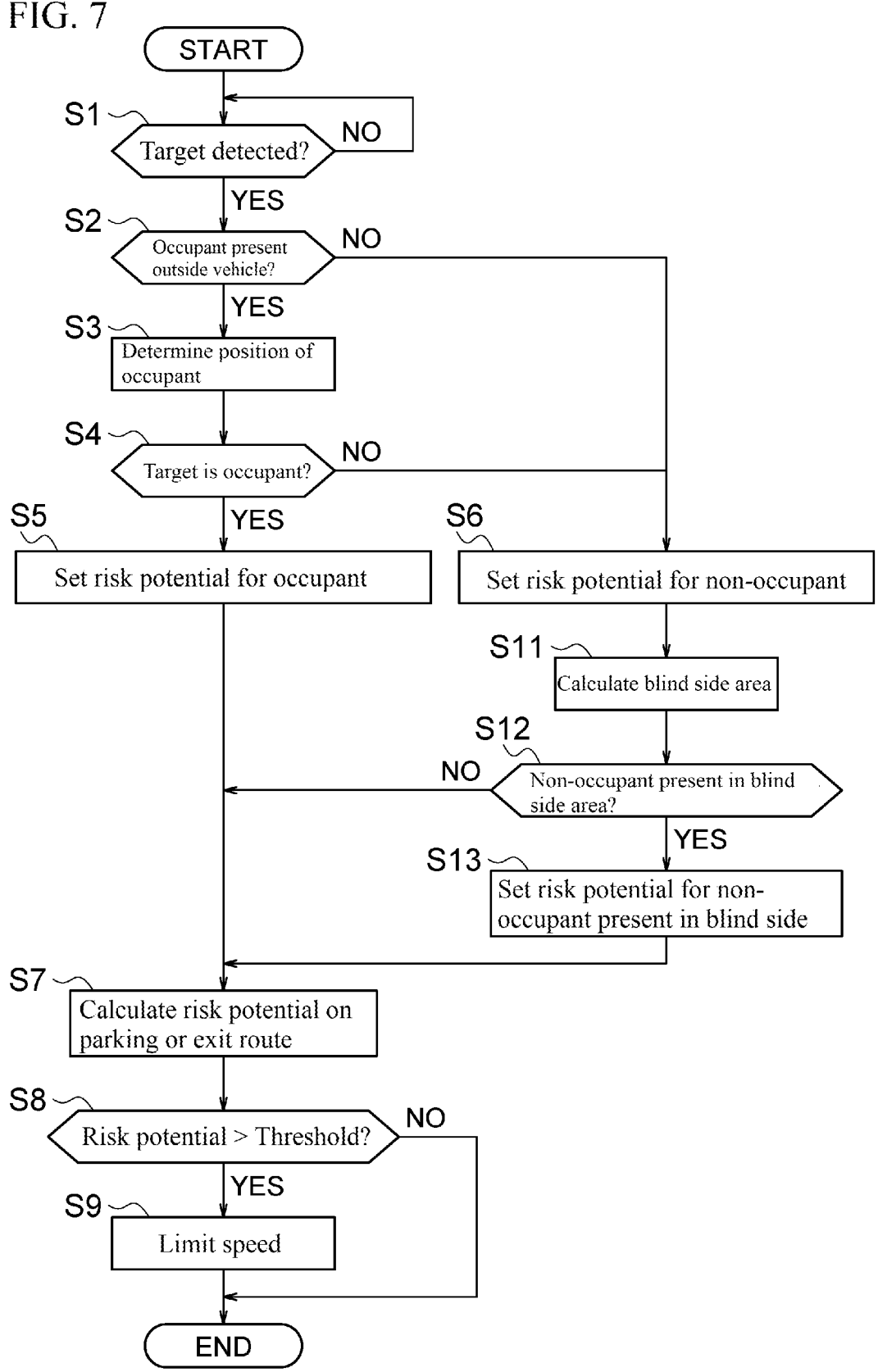
FIG. 7 is a flowchart illustrating the procedure of parking or exit assist executed by the parking and exit assist apparatus according to another embodiment.

FIG. 7 is a flowchart illustrating the procedure of parking or exit assist according to the present embodiment. The control represented by the flowchart is started when the main switch 40 is operated and the start of parking assist or exit assist is instructed. First, steps S1 to S6 of the flowchart illustrated in FIG. 4 are executed to set the risk potential when the target detected by the target detection unit 510 is an occupant 1 of the subject vehicle 4 or the risk potential when the target detected by the target detection unit 510 is a no-occupant 2 of the subject vehicle 4.

Step S6 is followed by step S11 in which the risk speed calculation unit 511 calculates the blind side area 5. Then, in step S12, the risk speed calculation unit 511 determines whether or not a non-occupant 2 is present in the blind side area 5. An affirmative determination is followed by step S13 while a negative determination is followed by step S7.

In step S13, the risk speed calculation unit 511 sets the risk potential for the non-occupant 2 present in the blind side area 5. In this step, the risk potential for the non-occupant 2 present in the blind side area 5 is set higher than the risk potential for a non-occupant 2 present in the non-blind side area 6. Then, steps S7 to S9 of the flowchart of FIG. 4 are executed, and the process is completed.

As described above, in the method of setting determination criteria for an obstacle for the subject vehicle 4 according to the present embodiment, the first determination criterion (first risk potential) for determining whether or not the non-occupant 2 is an obstacle for the subject vehicle 4 is set in accordance with the positional relationship between the occupant 1 of the subject vehicle 4 present outside the subject vehicle 4 and the subject vehicle 4. This allows the first determination criterion suitable for the situation to be set when the occupant 1 of the subject vehicle 4 performs remote control of the subject vehicle 4 from outside of the subject vehicle 4. For example, the risk potential for a non-occupant 2 present in the blind side area 5 which is a blind side from the occupant 1 due to the subject vehicle 4 is set higher than the risk potential for a non-occupant 2 present in the non-blind side area 6.

In the method of setting determination criteria for an obstacle for the subject vehicle 4 according to the present embodiment, when the occupant 1 of the subject vehicle 4 performs remote control of the subject vehicle 4 from outside of the subject vehicle 4, the risk potential for a non-occupant 2 present in the blind side area 5 which is a blind side from the occupant 1 due to the subject vehicle 4 is set higher than the risk potential for a non-occupant 2 present in the non-blind side area 6, and it is thereby possible to appropriately set the speed limit for the subject vehicle 4 which is controlled by remote control to move in the blind side area 5 from the occupant 1. Specifically, it is possible to appropriately execute deceleration or stop of the vehicle during movement of the vehicle.

Figure 8:
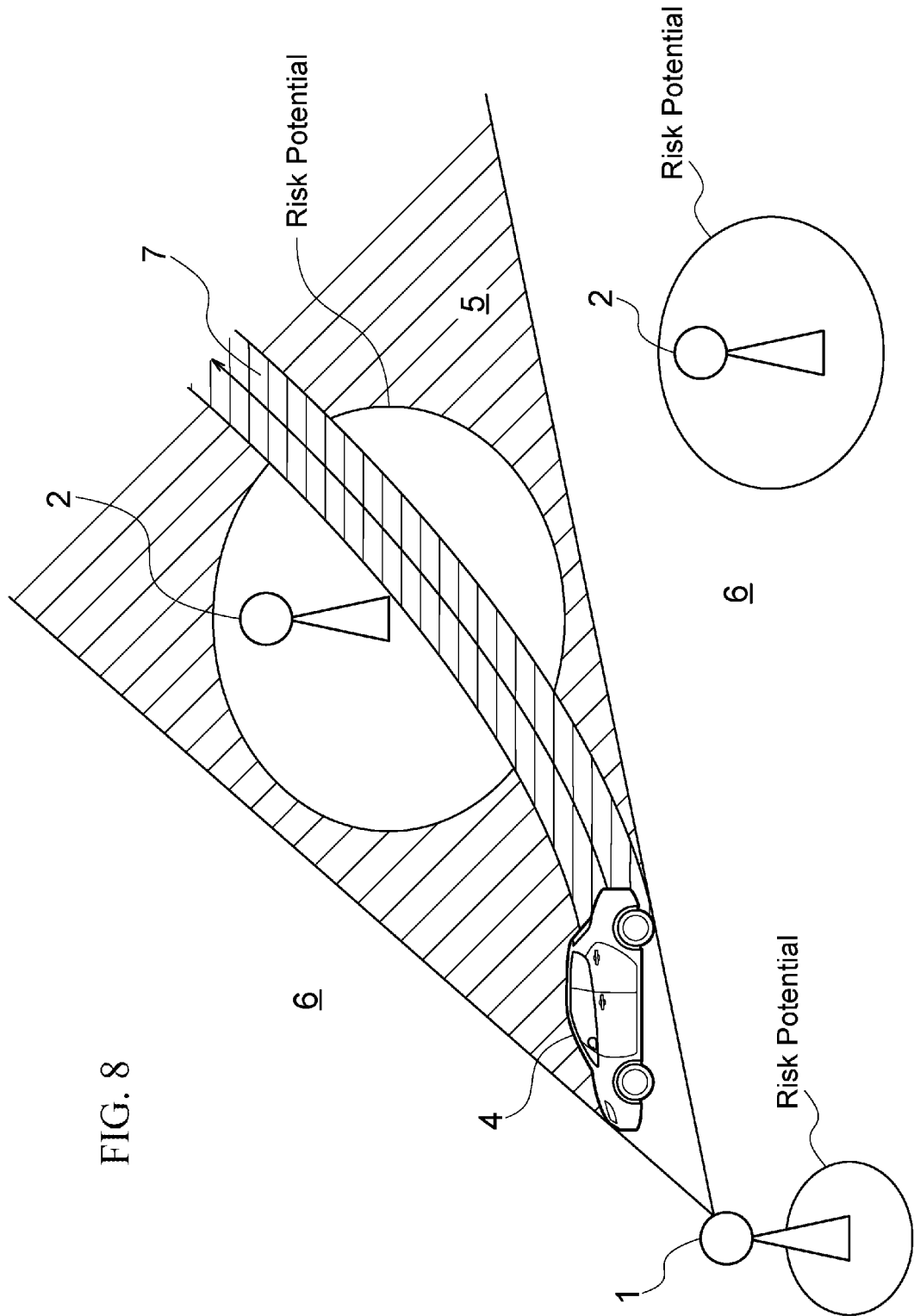
FIG. 8 is a diagram for describing a method of setting determination criteria for an obstacle for the subject vehicle according to another embodiment.

FIG. 8 is a diagram for describing a method of setting determination criteria for an obstacle for the subject vehicle according to another embodiment. In the method of setting determination criteria for an obstacle according to the present embodiment, when the target detected by the target detection unit 510 is an occupant 1 of the subject vehicle 4, the risk speed calculation unit 511 (see FIG. 2) sets the risk potential having a distribution with smaller variance than that of the risk potential when the target detected by the target detection unit 510 is a non-occupant 2. In addition to this, the risk speed calculation unit 511 sets the risk potential in the area (blind side area) 5, which is a blind side due to the subject vehicle 4 from the occupant 1 of the subject vehicle 4 present outside the subject vehicle 4, to be higher than the risk potential in the area (non-blind side area) 6 which is not a blind side due to the subject vehicle 4 from the occupant 1 of the subject vehicle 4 present outside the subject vehicle 4. Furthermore, the risk speed calculation unit 511 sets the risk potential on a parking or exit route 7 of the subject vehicle 4 to be higher than the risk potential in an area that does not overlap the parking or exit route 7 of the subject vehicle 4. Here, the "parking or exit route" refers to a strip-like area having a width equivalent to the width of the vehicle, rather than a line.

That is, when the detected object detected outside the vehicle by the target detection unit 510 is an occupant 1 of the subject vehicle 4, a determination criterion for an obstacle is set with which the detected object is less likely to be determined as an obstacle used for limiting the speed of the subject vehicle 4 as compared with when the detected object detected outside the vehicle by the target detection unit 510 is a non-occupant 2, and in addition to this, when the detected object detected outside the vehicle by the target detection unit 510 is present in the blind side area 5, a determination criterion for an obstacle is set with which the detected object is more likely to be determined as an obstacle used for limiting the speed of the subject vehicle 4 as compared with when the detected object detected outside the vehicle by the target detection unit 510 is present in the non-blind side area 6. Furthermore, when the detected object detected outside the vehicle by the target detection unit 510 is present in an area of the parking or exit route 7 of the subject vehicle 4, a determination criterion for an obstacle is set with which the detected object is more likely to be determined as an obstacle used for limiting the speed of the subject vehicle 4 as compared with when the detected object detected outside the vehicle by the target detection unit 510 is present in an area other than the parking or exit route 7. This allows the parking or exit operation of the subject vehicle 4 to be achieved in accordance with the situation. For example, when a non-occupant 2 is present in the blind side area 5 and in the area of the parking or exit route 7, the speed limit for the subject vehicle 4 is set lower than that when a non-occupant 2 is present in the non-blind side area 6 or in an area other than the parking or exit route 7 in the blind side area 5.

Embodiments heretofore explained are described to facilitate understanding of the present invention and are not described to limit the present invention. It is therefore intended that the elements disclosed in the above embodiments include all design changes and equivalents to fall within the technical scope of the present invention.

For example, in the above-described embodiments, the present invention has been described with reference to the parking and exit assist apparatus 100, but the present invention may be applied to an apparatus that carries out one of parking assist and exit assist. Moreover, the present invention is not limited to being applied to parking assist and exit assist and may be applied to a travel assist apparatus that carries out travel assist when the driver or passenger is present outside the vehicle.

DESCRIPTION OF REFERENCE NUMERALS

1 Occupant (driver or passenger)
2 Non-occupant
3 Determination range
3' Determination range
4 Subject vehicle
5 Blind side area
6 Non-blind side area
7 Parking or exit route
50 Parking and exit assist ECU
100 Parking and exit assist apparatus

The invention claimed is:

1. A method of determining obstacles, executed using a controller configured to determine whether or not a detected object detected outside a subject vehicle is an obstacle for the subject vehicle, which is remote controlled, on a basis of a predetermined determination criterion, the method comprising:
 determining whether or not the detected object is a driver or passenger of the subject vehicle;
 when the detected object is not the driver or passenger of the subject vehicle,
  determining whether or not the detected object is an obstacle for the subject vehicle on a basis of a first determination criterion stored in the controller;
 when the detected object is the driver or passenger of the subject vehicle, performing steps comprising:

setting a second determination criterion stored in the controller, wherein the second determination criterion is such that the detected object is less likely to be determined as an obstacle for the subject vehicle using the second determination criterion than using the first determination criterion; and determining whether or not the detected object is an obstacle for the subject vehicle on a basis of the second determination criterion; and controlling a speed of the subject vehicle based on the one of the first determination criterion or the second determination criterion that is set.

2. The method of determining obstacles according to claim 1, wherein the first determination criterion is set in accordance with a positional relationship between the driver or passenger of the subject vehicle present outside the subject vehicle and the subject vehicle.

3. The method of determining obstacles according to claim 2, wherein the first determination criterion in a blind side area that is a blind side due to the subject vehicle from the driver or passenger of the subject vehicle present outside the subject vehicle is set to a criterion with which the detected object is more likely to be determined as an obstacle for the subject vehicle than with the first determination criterion outside the blind side area.

4. The method of determining obstacles according to claim 2, wherein the first determination criterion in a traveling area of the subject vehicle is set to a criterion with which the detected object is more likely to be determined as an obstacle for the subject vehicle than with the first determination criterion outside the traveling area.

5. A parking assist method comprising the method of determining obstacles according to claim 1, the parking assist method executing parking assist for the subject vehicle using the controller, wherein controlling the speed of the subject vehicle based on the one of the first determination criterion or the second determination criterion that is set comprising:

calculating a speed limit for a parking operation of the subject vehicle when a determination is made that the detected object is an obstacle for the subject vehicle; and executing the parking operation of the subject vehicle at the speed that is not higher than the speed limit.

6. An exit assist method comprising the method of determining obstacles according to claim 1, the exit assist method executing exit assist for the subject vehicle using the controller, wherein controlling the speed of the subject vehicle based on the one of the first determination criterion or the second determination criterion that is set comprising:

calculating a speed limit for an exit operation of the subject vehicle when a determination is made that the detected object is an obstacle for the subject vehicle; and executing the exit operation of the subject vehicle at the speed that is not higher than the speed limit.

7. A device for determining obstacles, comprising a controller configured to determine whether or not a detected object detected outside a subject vehicle is an obstacle for the subject vehicle on a basis of a predetermined determination criterion, the controller being further configured to:

determine whether or not the detected object is a driver or passenger of the subject vehicle;

when the detected object is not the driver or passenger of the subject vehicle, determine whether or not the detected object is an obstacle for the subject vehicle on a basis of a first determination criterion stored in the controller;

when the detected object is the driver or passenger of the subject vehicle, perform steps to:

set a second determination criterion stored in the controller, wherein the second determination criterion is such that the detected object is less likely to be determined as an obstacle for the subject vehicle using the second determination criterion than using the first determination criterion; and determine whether or not the detected object is an obstacle for the subject vehicle on a basis of the second determination criterion with which the detected object is less likely to be determined as an obstacle for the subject vehicle than with the first determination criterion; and based on the one of the first determination criterion or the second determination criterion that is set.

* * * * *